Patented May 19, 1925.

1,538,862

UNITED STATES PATENT OFFICE.

WILLIAM G. LINDSAY, OF NEWARK, NEW JERSEY, ASSIGNOR TO THE CELLULOID COMPANY, A CORPORATION OF NEW JERSEY.

CELLULOSE COMPOSITION.

No Drawing.   Application filed June 6, 1924. Serial No. 718,228.

*To all whom it may concern:*

Be it known that I, WILLIAM G. LINDSAY, a citizen of the United States, residing at Newark, in the county of Essex and State of New Jersey, have invented certain new and useful Improvements in Cellulose Compositions, of which the following is a specification.

This invention relates to non-inflammable cellulose compositions and to a process of forming the same. This composition is adapted for use in the manufacture of films, sheets, plastic materials, toilet articles and similar bodies.

The degree of non-inflammability sought for is that which will not permit of a self sustaining combustion after the application of a flame at ordinary or normal temperature. This degree of non-inflammability will however, be varied according to desired conditions.

I have discovered that inflammable cellulose materials which permit of a self sustaining combustion may be prevented from burning under ordinary conditions and rendered non-inflammable provided there is present in suitable combination certain salts of cerium. I preferably employ cerium oxalate $Ce_2(C_2O_4)_3 \cdot 9H_2O$, although I find that other compounds of cerium, such as cerium carbonate $Ce_2(CO_3)_3 \cdot 9H_2O$, are effective but to a lesser degree. These compounds are capable of absorbing or taking up through decomposition, volatilization, or other change, all or a major part of the heat that would be necessary to raise the material or its components to the point at which ignition could be sustained.

These heat absorbing or endothermic substances will decompose or otherwise be in condition to absorb heat before or when the temperature of decomposition of the material to be rendered non-inflammable has been reached. The relative proportions of the combustible or exothermic substance which is to be rendered non-inflammable and the endothermic or heat absorbing substance will be varied somewhat to meet conditions of strength, plasticity, transparency, or other desirable characteristics, but the general rule is that a sufficient quantity of endothermic substance should be employed to absorb a sufficient amount of heat to prevent sustained combustion of the exothermic substance.

In carrying out my invention, any one of a number of products may be the aim. The characteristics of these products may vary from that of a hard, non-moldable, dense solid sheet material which may be used for cutting out various objects such as brush backs, mirror backs, knife handles, etc. to that of a thin, highly flexible product which may be used for the veneering of fabrics, paper and the like, or which may be used in the place of various textiles or other flexible materials. The flexible compound may also be used as a substitute for leather. It may possess the necessary characteristics required in compounds that are to be molded, such as molded boxes, handles, brushes, mirrors, etc.

The exothermic substances which I may use are nitrocellulose, acetylcellulose, or some cellulosic ester, ether, derivative or compound.

The permanent or non-volatile solvent combined with the cellulose compound for the purpose of bringing about the necessary conversion, etc. in the process of manufacture should be of such a nature that the point of ignition is relatively high. I have found that the organic phosphates possess the necessary characteristics of solubility, stability and at the same time possess the requisite temperature of ignition. The most satisfactory results are produced with aromatic phosphates, such as tricresylphosphate although in certain cases other plasticizers may be employed.

In the manufacture of these non-inflammable compositions, I may proceed substantially as in the manufacture of ordinary pyroxylin plastics, incorporating the exothermic compound with the soaked or colloidized mass of pyroxylin or other cellulose derivative and aromatic phosphate prior to final mastication on the rolls. This incorporation may be effected in kneaders or the endothermic compound may be directly added during the course of mastication on the rolls. The endothermic salt may be incorporated with the pyroxylin or other compound while the latter is in a hydrous condition in the same operation in which the liquid tricresylphosphate is incorporated in accordance with the method described in my U. S. Patent No. 1,233,374 granted July 17, 1917.

In the choice of a liquid volatile solvent, I may select any one or combination of the common solvents such as methyl alcohol, ethyl alcohol, acetic ether, acetone, amyl acetate or the various commercial grades and mixtures of these compounds. Such compositions when manufactured according to the usual manner as obtain in the pyroxylin plastic industry will possess a hardness, toughness and moldability in a similar degree to the usual varieties of pyroxylin plastics.

The following are examples of the ingredients and proportions which I may employ in the manufacture of plastic masses:

100 parts pyroxylin, 60–80 parts liquid tricresylphosphate, 50 to 150 parts cerium oxalate.

100 parts acetyl cellulose, 15 to 30 parts liquid tricresylphosphate, 10 to 40 parts cerium oxalate.

In the manufacture of flexible non-inflammable compositions having the properties of leather and the like, I may proceed as in the examples above described, except that I employ 140 to 200 parts of liquid tricresylphosphate to 100 parts of the cellulose compound for nitrocellulose compositions and from 30 to 50 parts for acetyl cellulose or other similar cellulosic derivative.

I claim:

1. A composition comprising a cellulosic derivative and an aromatic phosphate in admixture with cerium oxalate.

2. A thermo plastic composition comprising a cellulose derivative plasticized by an aromatic phosphate in admixture with sufficient cerium oxalate to produce a fire retarding effect.

3. A thermo plastic composition comprising a cellulose ester plasticized by an aromatic phosphate in admixture with sufficient cerium oxalate to produce a fire retarding effect.

4. A thermo plastic composition comprising pyroxylin plasticized by tricresylphosphate in admixture with sufficient cerium oxalate to produce a fire retarding effect.

5. A composition containing pyroxylin, tricresylphospate and cerium oxalate.

6. The process which consists in mixing liquid tricresylphosphate and cerium oxalate with hydrous pyroxylin.

7. The process which consists in mixing liquid tricresylphosphate and cerium oxalate with hydrous pyroxylin, and manipulating the mixture in the presence of a volatile solvent.

8. A cellulose composition having substantially the toughness and moldability of the usual pyroxylin plastics, said composition containing in excess of 5 per cent cerium oxalate.

9. A tough consolidated non-inflammable cellulose composition containing cerium oxalate.

10. A tough non-inflammable cellulose composition containing cerium oxalate in excess of 5 per cent of the composition.

11. A non-inflammable composition having substantially the physical properties of the usual pyroxylin plastics, said composition having as a base a cellulose derivative plasticized by an aromatic phosphate and as a fire retarding ingredient a heat absorbing salt of cerium.

12. A composition comprising a cellulose derivative, a plasticizer therefor and cerium oxalate.

13. A non-inflammable composition having substantially the physical properties of the usual pyroxylin plastics, such composition having as a base, a plasticized cellulose derivative and as a fire retarding ingredient a heat absorbing salt of cerium.

WILLIAM G. LINDSAY.

Certificate of Correction.

It is hereby certified that in Letters Patent No. 1,538,862, granted May 19, 1925, upon the application of William G. Lindsay, of Newark, New Jersey, for an improvement in "Cellulose Compositions," an error appears in the printed specification requiring correction as follows: Page 1, lines 94 and 95, for the word "exothermic" read *endothermic;* and that the said Letters Patent should be read with this correction therein that the same may conform to the record of the case in the Patent Office.

Signed and sealed this 23d day of June, A. D. 1925.

[SEAL.]
KARL FENNING,
*Acting Commissioner of Patents.*